United States Patent [19]

Okuhara et al.

[11] 4,318,131
[45] Mar. 2, 1982

[54] TV CAMERA SYSTEM HAVING SYNCHRONIZED OSCILLATORS IN CAMERA HEAD AND CCU

[75] Inventors: Mitsuhiko Okuhara, Yokohama; Taizou Nishino, Tokyo; Kazuo Kawamura, Yokohama; Toshiaki Aoki, Kawasaki, all of Japan

[73] Assignee: Tokyo Shibaura Denki Kabushiki Kaisha, Japan

[21] Appl. No.: 135,129

[22] Filed: Mar. 28, 1980

[30] Foreign Application Priority Data

Mar. 30, 1979 [JP] Japan .................................. 54-36959

[51] Int. Cl.³ ............................................. H04N 5/30
[52] U.S. Cl. ........................................ 358/210; 358/41
[58] Field of Search .................. 358/210, 185, 149, 41, 358/86, 142–144, 10, 139

[56] References Cited

U.S. PATENT DOCUMENTS 3,518,376  6/1970  Kamen et al. ........................ 358/143

OTHER PUBLICATIONS

Cuomo, "A Digitally Controlled Color Television Camera," *Journal of the SMPTE*, vol. 79, No. 11, Nov. 1970, pp. 1003–1008.

*Primary Examiner*—John C. Martin
*Attorney, Agent, or Firm*—Finnegan, Henderson, Farabow, Garrett & Dunner

[57] ABSTRACT

In a television camera apparatus comprising a camera head, a camera control unit, and a camera cable for transmission of signals between the camera head and the camera control unit, the signals to be transmitted modulate frequency signals corresponding to integral multiples of a reference frequency, and the modulated signals are mixed and transmitted by means of the single-core camera cable. Oscillators to produce reference frequency signals are provided respectively for the camera head and the camera control unit, the oscillator of the camera head being controlled for synchronism by the reference frequency signal of the oscillator of the camera control unit or vice versa.

9 Claims, 6 Drawing Figures

4,318,131

TV CAMERA SYSTEM HAVING SYNCHRONIZED OSCILLATORS IN CAMERA HEAD AND CCU

BACKGROUND OF THE INVENTION

This invention relates to a television camera apparatus.

According to a television camera apparatus used in studios of broadcasting stations and other facilities, a camera head and a camera control unit are connected by using a camera cable. By means of the camera cable, video signals are transmitted from the camera head to the camera control unit, while various control and adjusting signals are transmitted from the camera control unit to the camera head. Conventionally, considerably thick and heavy multi-core cables are used for the transmission of these various signals. Such multi-core cables will, however, constitute a substantial hindrance to the shifting of the camera head.

SUMMARY OF THE INVENTION

Accordingly, the object of this invention is to provide a television camera apparatus capable of transmitting multiplexed signals through a single transmission line.

According to this invention, oscillators to produce reference frequency signals are provided respectively for a camera head and a camera control unit, various transmission signals modulate signals with frequencies equivalent to integral multiples of the reference frequency, and the modulated signals are mixed for multiplication and transmitted by way of a single transmission line or single-core camera cable. The oscillator of the camera head is controlled for synchronism by the reference frequency signal of the oscillator of the camera control unit.

DETAILED DESCRIPTION OF THE PREFERRED EMBODIMENT

Figure 1:
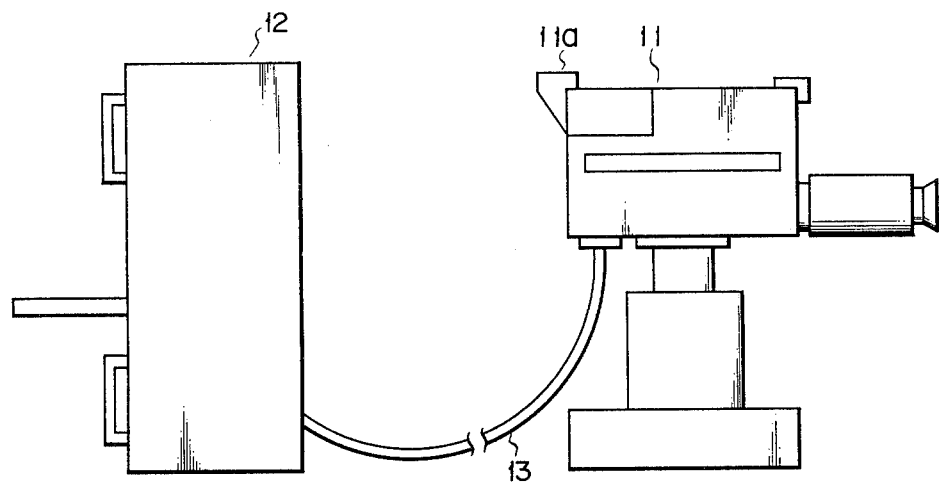
FIG. 1 is a side view of a television camera apparatus.

As shown in FIG. 1, the television camera apparatus of this invention is composed of a camera head 11 and a camera control unit 12 which are connected with each other by a camera cable 13. By means of this camera cable 13, a video signal is transmitted from the camera head 11 to the control unit 12, and signals for controlling and adjusting the camera head 11 are transmitted from the control unit 12 to the camera head 11. In this case, the signals from the camera head 11 and the camera control unit 12 are modulated by signals corresponding to integral multiples of a reference frequency, and the modulated signals are combined and laid on the camera cable 13. Referring now to FIG. 1, the construction and operation of the apparatus will be described in detail.

Figure 2A:
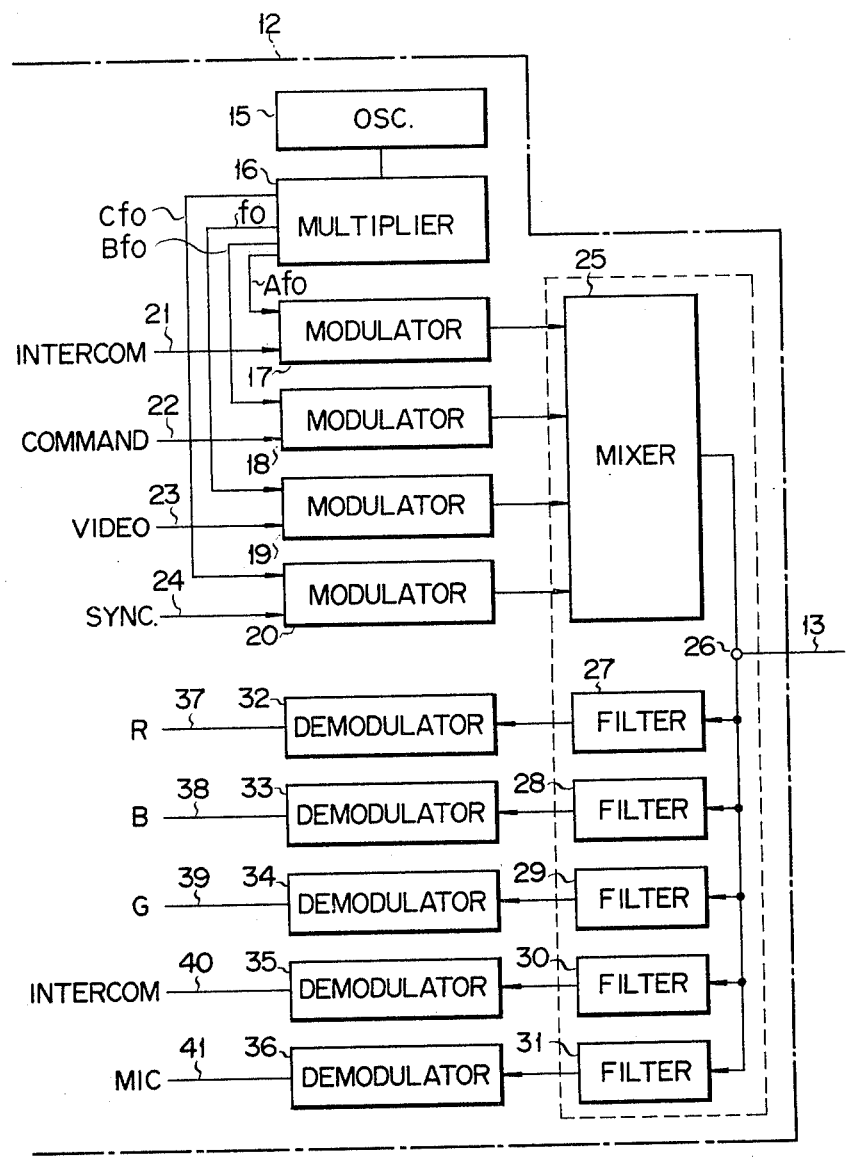
FIGS. 2A and 2B show a circuit view of a signal transmitter-receiver circuit section of the television camera apparatus.

As shown in FIG. 2A, the camera control unit 12 is provided with a reference signal oscillator 15 with reference frequency fo. The output terminal of the oscillator 15 is connected to a multiplier 16. The multiplier 16 produces the reference frequency signal and signals with frequencies Afo, Bfo and Cfo corresponding to integral multiples of the reference frequency fo, and output terminals of the multiplier 16 from which these frequency signals are derived are connected to respective one input terminals of modulators 17, 18, 19 and 20. The other input terminals of the modulators 17, 18, 19 and 20 are connected with the output ends of an intercom signal line 21, command signal line 22, video signal line 23, and a synchronizing signal line 24, respectively. The respective output terminals of the modulators 17 to 20 are connected to input terminals of a mixer 25. The output terminal of the mixer 25 is connected to a connector 26 which is connected to the single-core camera cable 13. The connector 26 is also connected to the respective input terminals of filters 27, 28, 29, 30 and 31. These filters 27 to 31 are intended to divide signals, such as Red(R), Blue(B) and Green(G) video signals, an intercom signal, and a microphone signal, which are transmitted by means of the camera cable 13 and modulated by signals with different frequencies as mentioned later. The output terminals of the filters 27, 28, 29, 30 and 31 are connected to the input terminals of demodulators 32, 33, 34, 35 and 36, respectively. The output terminals of these demodulators 32 to 36 are connected to R, B and G video signal lines 37, 38 and 39, an intercom signal line 40, and a microphone signal line 41, respectively.

Figure 2B:
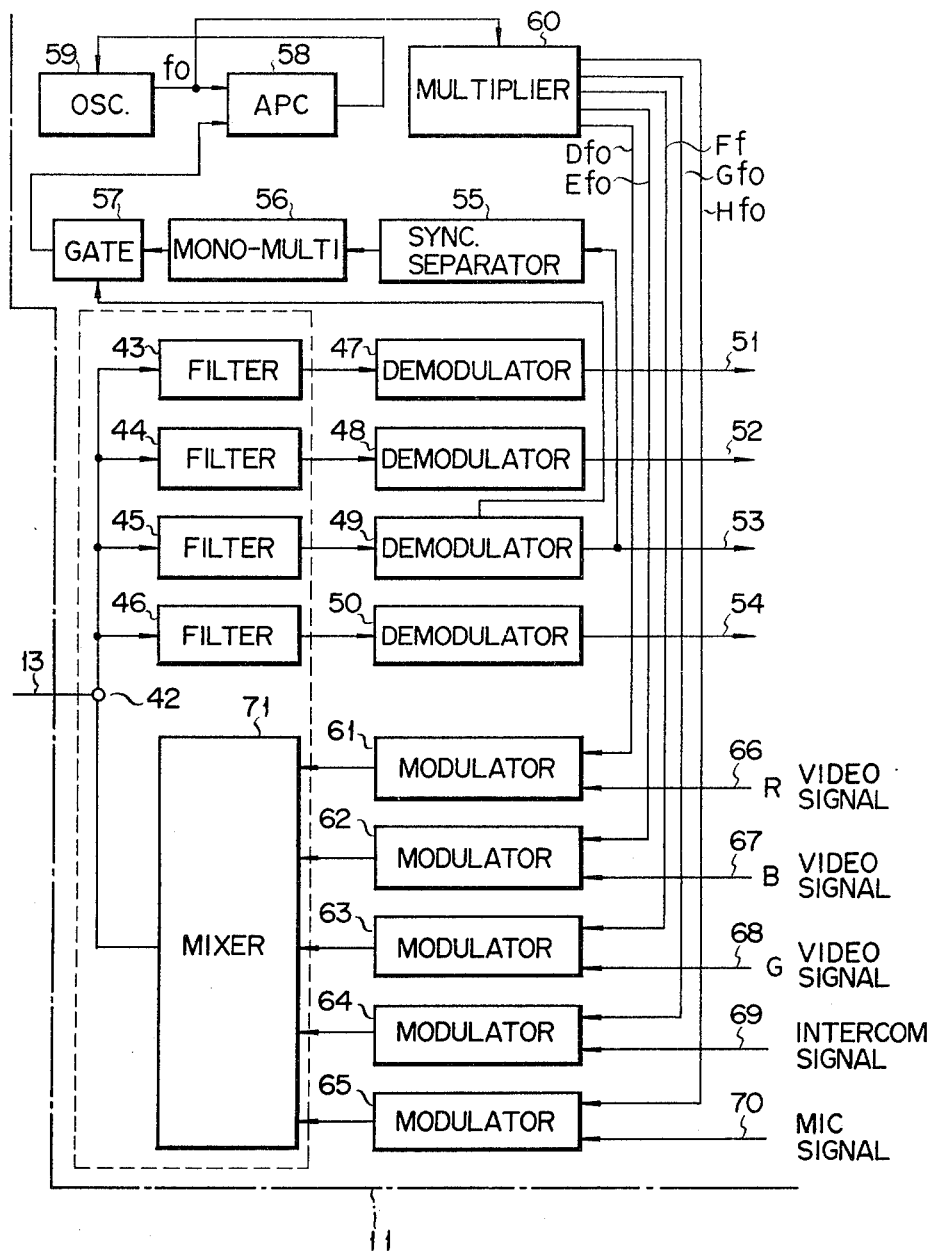

In the camera head 11 shown in FIG. 2B, on the other hand, a connector 42 coupled with the camera cable 13 is connected to the respective input terminals of filters 43, 44, 45 and 46. These filters 43 to 46 are intended to divide an intercom signal, command signal, video signal and synchronizing signal which are transmitted from the camera control unit 12 by means of the camera cable 13 and modulated by signals with different frequencies. The output terminals of the filters 43, 44, 45 and 46 are connected to the input terminals of demodulators 47, 48, 49 and 50, respectively. The output terminals of these demodulators 47 to 50 are connected to intercom, command, video and synchronizing signal lines 51, 52, 53 and 54, respectively. The output terminal 53 of the demodulator 49 for demodulating the video signal modulated by a signal with the reference frequency fo is connected to a synchronizing signal separator 55. The output terminal of the synchronizing signal separator 55 is connected to one input terminal of a gate circuit 57 through a monostable multivibrator 56. The other input terminal of the gate circuit 57 is connected with a reference frequency signal output terminal of the demodulator 49. The output terminal of the gate circuit 57 is connected to one input terminal of an automatic phase controller 58. The other input terminal of the automatic phase controller 58 is connected with the output terminal of an oscillator 59. Producing signals with the reference frequency fo, the oscillator 59 is so constructed as to synchronize with the reference signal from the oscillator 15 of the camera control unit 12. The output terminal of the oscillator 59 is connected to a multiplier 60 which produces signals with frequencies Dfo, Efo, Ffo, Gfo and Hfo equivalent to integral multiples of the reference frequency fo. Output terminals of the multiplier 60 from which these signals are derived are connected to respective one input terminals of modulators 61, 62, 63, 64 and 65. The other input terminals of these modulators 61 to 65 are connected respectively to R, B and G video signal lines 66, 67 and 68, an intercom signal line 69, and a microphone signal line 70 which are connected to a camera tube. The respective output terminals of the modulators 61 to 65 are connected to the input terminal of a mixer 71. The output terminal of the mixer 71 is connected to the connector 42.

Figure 3A:
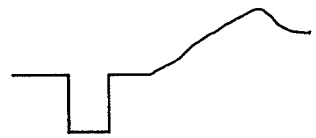
FIG. 3A shows a video signal.
Figure 3B:
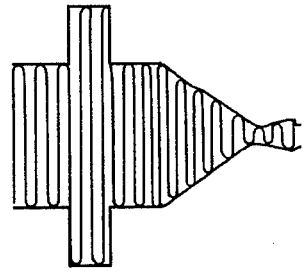
FIG. 3B shows a modulated video signal.
Figure 3C:
FIG. 3C shows a demodulated reference signal.

In the aforementioned television camera apparatus, when the intercom, command, video and synchronizing signals are supplied to the modulators 17 to 20 by means of the signal lines 21 to 24 of the camera control unit 12, the frequency signals Afo, Bfo, fo and Cfo from the multiplier 16 are modulated by those signals. In this case, the reference frequency signal fo is modulated by a video signal including a synchronizing signal as shown in FIG. 3A, and a modulated signal shown in FIG. 3B is delivered from the modulator 19. The modulated signals from the modulators 17 to 20 are supplied to the mixer 25 and mixed. A mixed modulated signal from the mixer 25 is transmitted to the camera head 11. In the camera head 11, the transmitted mixed modulated signal is supplied to the filters 43 to 46. These filters 43 to 46 pass modulated signals corresponding to the frequency signals Afo, Bfo, fo and Cfo, respectively. Namely, the mixed modulated signal is separated into several modulated signals by the filters 43 to 46. The modulated signals from the filters 43 to 46 are demodulated by their corresponding demodulators 47 to 50 and led out to the signal lines 51 to 54. The demodulated signals from these signal lines, that is, the intercom, command, video and synchronizing signals, are supplied to their corresponding circuits (not shown). At the same time, the video signal is supplied to a view finder 11a of the camera head 11. Further, the video signal is supplied to the synchronizing signal separator 55 to separate the synchronizing signal. The separated synchronizing signal is shaped by the monostable multivibrator 56, and a gate signal on the backporch of the synchronizing signal is transferred to the gate circuit 57. The gate circuit 57 is also supplied with the reference frequency signal fo which is derived from the demodulator 49 and transmitted from the camera control unit 12. Thus, the gate circuit 57 produces a reference frequency signal fo as shown in FIG. 3C in response to an output signal from the monostable multivibrator 56. This reference frequency signal fo, together with the reference frequency signal fo from the oscillator 59, is supplied to the automatic phase controller 58. The automatic phase controller 58 compares the phases of these two reference frequency signals fo, and produces an output signal corresponding to the phase difference. This output signal is supplied as a control signal to a control input terminal of the oscillator 59, which is controlled so that the reference frequency thereof may be coincident with the reference frequency of the oscillator 15 of the camera control unit 12. The output signal of the oscillator 59 is converted into the frequency signals Dfo, Efo, Gfo and Hfo corresponding to integral multiples of the reference frequency fo by the multiplier 60. These frequency signals are supplied to the modulators 61 to 65 respectively, and modulated by the R, B and G video signals, intercom signals and microphone signal of the signal lines 66 to 70, respectively. The modulated signals from these modulators 61 to 65 are mixed by the mixer 71, and transmitted to the camera control unit 12 by means of the camera cable 13. In the camera control unit 12, the transmitted mixed modulated signal is separated into R, B and G video modulated signals, an intercom modulated signal and a microphone modulated signal by the filters 27 to 31. These separated modulated signals are demodulated into the original signals respectively by the demodulators 32 to 36, and led to their corresponding circuits by means of the signal lines 37 to 41.

According to this invention, as described above, various signals to be transmitted between the camera head and camera control unit modulate signals with different frequencies, and the modulated signals are mixed and laid as multiplexed signals on the transmission line or camera cable, so that signal transmission can be performed by means of a single-core camera cable. Moreover, since the oscillation frequency of one of the respective reference frequency signal oscillators of the camera head and the camera control unit is controlled on the basis of the reference frequency signal of the other so that these two oscillators may synchronize with each other, the occurrence of beat and the like may be prevented by the frequency difference between the oscillation signals from the oscillators. Furthermore, the identity between both reference signals facilitates selection of the modulated frequency of each signal.

What we claim is:

1. A television camera apparatus comprising a camera head, a camera control unit, and a camera cable for transmission of signals between said camera head and said camera control unit, said camera control unit including means for producing various first signals to be transmitted to said camera head, a first oscillator producing a first reference frequency signal, means for producing a plurality of second signals with frequencies equivalent to integral multiples of the reference frequency of the first reference frequency signal from said first oscillator, first modulator means for modulating the second signals from said second signal producing means respectively by means of the first signals from said first signal producing means to produce first modulated signals, and first mixer means for mixing the first modulated signals from said first modulator means to produce a first mixed signal and for transmitting said first mixed signal to said camera head by means of said camera cable;

said camera head including first filter means for separating said first mixed signal from said camera control unit into said first modulated signals, first demodulator means for demodulating said separated first modulated signals from said first filter means into said first signals, a second oscillator for producing a second reference frequency signal, means for producing a plurality of third signals with frequencies equivalent to integral multiples of the reference frequency of the second reference frequency signal of said second oscillator, means for producing various fourth signals to be transmitted to said camera control unit, second modulator means for modulating the third signals from said third signal producing means by means of the fourth signals from said fourth signal producing means to produce second modulated signals, and second mixer means for mixing the second modulated signals from said second modulator means to produce a second mixed signal and for transmitting said second mixed signal to said camera control unit by means of said camera cable;

said camera control unit further including second filter means for separating said second mixed signal from said camera head into several second modulated signals, and second demodulator means for demodulating said separated second modulated signals from said second filter means into said fourth signals and means in one of said camera control unit and said camera head unit for extracting a signal corresponding to the reference frequency signal of the oscillator of the other of said camera control unit and said camera head and for synchronizing the oscillation of said oscillator in said one of said camera control unit and said camera head in accordance with said extracted signal.

2. A television camera apparatus according to claim 1, wherein said first signal generating means produces an intercom signal, a command signal, a video signal, and a synchronizing signal.

3. A television camera apparatus according to claim 1, wherein said fourth signal generating means produces red, blue and green video signals, an intercom signal, and a microphone signal.

4. A television camera apparatus according to claim 1, wherein said second signal generating means is composed of a multiplier for multiplying the reference frequency signal of said first oscillator.

5. A television camera apparatus according to claim 1, wherein said third signal generating means is composed of a multiplier for multiplying the reference frequency signal of said second oscillator.

6. A television camera apparatus according to claim 1, wherein said first signal producing means produces at least a video signal including a synchronizing signal, said first modulator means modulates the first reference frequency signal of said first oscillator by means of said video signal, said first demodulator means demodulates said modulated first reference frequency signal to produce said first reference frequency signal and said video signal, and said extracting means is included in said camera head and comprises a synchronizing signal separator for separating the synchronizing signal from the demodulated video signal, a mono-multivibrator for shaping said synchronizing signal, means for gating said first reference frequency signal produced by said first demodulator means in accordance with the output signal of said mono-multivibrator, and means for receiving the output of said gating means and said second oscillator, for detecting a phase difference between said two received signals, and for supplying a phase correction signal to said second oscillator to control said second oscillator to adjust the frequency of said second reference frequency signal to eliminate said detected phase difference.

7. In a television camera apparatus including a camera control unit for generating first information signals, a camera head for generating second information signals, and a camera cable for transmitting the first and second information signals between the camera control unit and the camera head, a system for controlling the transmission of the first and second information signals over the cable, the system comprising:

first means associated with said camera control unit for generating a first reference frequency signal;

second means associated with said camera head for generating a second reference frequency signal;

third means associated with said camera control unit for (1) generating first carrier signals having frequencies that are multiples of said first reference frequency signal, (2) modulating said first carrier signals with said first information signals, and (3) transmitting said modulated first carrier signals in a multiplexed manner to said camera head over said cable;

first demodulating means associated with said camera head for receiving and for demodulating said multiplexed modulated first carrier signals and for separating said first information signals from said received and demodulated first carrier signals;

fourth means associated with said camera head for (1) generating second carrier signals having frequencies that are multiples of said second reference frequency signal, (2) modulating said second carrier signals with said second information signals, and (3) transmitting said modulated second carrier signals in a multiplexed manner to said camera control unit over said cable;

second demodulating means associated with said camera control unit for receiving and for demodulating said multiplexed modulated second carrier signals and for separating said second information signals from said received and demodulated second carrier signals; and fifth means in one of said camera control unit and said camera head for detecting a difference between the frequency of said first reference frequency signal and the frequency of said second reference frequency signal and for controlling said generating means of said one of said camera control unit and said camera head to adjust the frequency of said reference signal generated thereby to eliminate said detected frequency difference.

8. A transmission control system according to claim 7 wherein said first carrier signals are integral multiples of said first reference frequency signal and said second carrier signals are integral multiples of said second reference frequency signal.

9. A transmission control system according to claim 7 wherein said first means comprises a first oscillator and wherein said second means comprises a second oscillator, said second oscillator being controlled by said first reference frequency signal.

* * * * *